L. S. LACHMAN.
METHOD OF SIDE WELDING WIRES.
APPLICATION FILED JULY 12, 1920.
1,416,359. Patented May 16, 1922.
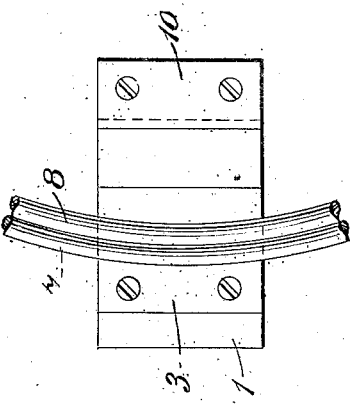
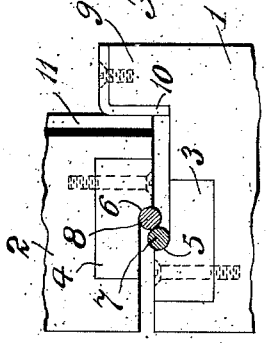
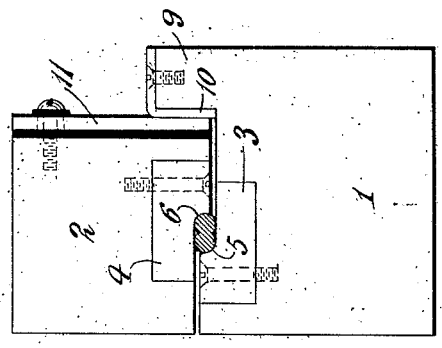
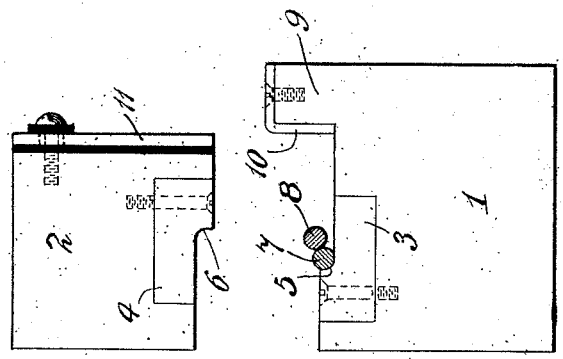
Inventor
LAURENCE S. LACHMAN
By his Attorneys

UNITED STATES PATENT OFFICE.

LAURENCE S. LACHMAN, OF NEW YORK, N. Y., ASSIGNOR TO UNIVERSAL ELECTRIC WELDING COMPANY, OF NEW YORK, N. Y., A CORPORATION OF NEW YORK.

METHOD OF SIDE WELDING WIRES.

1,416,359.   Specification of Letters Patent.   Patented May 16, 1922.

Application filed July 12, 1920. Serial No. 395,590.

*To all whom it may concern:*

Be it known that I, LAURENCE S. LACHMAN, a citizen of the United States, and a resident of New York, in the county of New York and State of New York, have invented certain new and useful Improvements in Methods of Side Welding Wires, of which the following is a specification.

My present invention relates to a method of side welding wires, that is when the wires contact with each other for a greater or less distance along their longitudinal sides. In other words, the invention relates to a method of welding wires when both parts at the place of desired union are parallel or run in the same general direction.

The object of the invention is to enable the welding of two wires or parts which it is desired to have disposed in the same plane by means of the electric resistance welding method.

It is also the object to effect the welding in a simple, quick and efficient manner.

The invention consists in the process or method of side welding wires hereinafter more particularly described and then set forth in the claims.

In the accompanying drawings I illustrate more or less diagrammatically a set of welding dies which may be employed in practicing the invention.

Fig. 1 is a side elevation of the welding dies with the work as placed therein at the initial stage of the process.

Fig. 2 is a plan view of the lower die with the work placed thereon.

Fig. 3 is a view similar to Fig. 1 but shows the dies in position when they have first gripped the work between them and when the electric current is turned on, or about to be turned on.

Fig. 4 is a similar view illustrating the position of the dies and the work at the completion of the welding operation.

Referring to the drawings, 1 indicates the lower die of any suitable construction and 2 indicates the co-acting upper die. As is usual the lower die 1 is preferably stationary and the upper die is reciprocated toward and away from it in the welding operation by any suitable mechanism.

The dies 1 and 2 are of copper or other suitable conducting material as is usual and form the terminals of the secondary circuit of a transformer forming part of an electric welding apparatus of any desired type or character. Electric welding machines and their operation are now so generally known and understood that it is deemed unnecessary herein to further describe the apparatus, it being understood that the dies 1 and 2 form the terminals of the welding circuit and are reciprocated toward and away from each other. If desired the lower die may be provided with a replaceable contact block 3 and the upper die with a replaceable contact block 4 to permit ready removal and replacement by dies having different work engaging surfaces to conform to the particular shape of the work desired to weld.

The upper die 4 is provided with a shoulder 6 running transversely across the die and the lower die 3 is provided with a similar shoulder 5 usually running parallel with the shoulder 6 and spaced apart therefrom when the dies are brought together. This space between the shoulders 5 and 6 forms the repository for the work to be welded.

In the initial stage of the process the work to be welded and which may consist of the wires 7, 8 are placed on the lower die, one of the wires, 7, being placed against the shoulder 5 and the other wire 8 making longitudinal side contact with the wire 7 and slightly overlapping it, so that said wires and their line of contact will occupy a common plane inclined to the line of pressure applied by the dies and to the plane of the finished work.

The upper die 2 is then brought toward the lower die and the shoulder 6 engages the side of the wire 8 as indicated in Fig. 3.

Preferably in order to positively prevent any relative lateral movement of the dies 1 and 2 when pressure is applied to force the wires 7 and 8 into the same plane, the lower die is provided with an upwardly projecting ledge 9 provided with a wear plate 10. The side of the upper die is provided with a wear plate 11 suitably insulated therefrom and said plate 11 when the die 2 approaches the die 1 engages the side of the wear plate 10 previous to the time the shoulder 6 engages the wire 8. Thus any tendency of the wires 7 and 8 to spread the dies laterally is positively prevented.

As soon as the shoulder 6 seats against the side of the wire 8 the electric circuit is closed in the usual way and the heating current flows from one die to the other transversely through the overlapped wires 7 and 8. As the current softens the work, downward pressure by the die 2 forces the wire 8 down into the plane of the wire 7 and as the distance between the shoulders 5 and 6 is somewhat less than the combined diameters of the wires 7 and 8 a certain amount of the wires are upset and forced together forming a weld. As soon as the wires are in the same plane as indicated in Fig. 4 the weld is completed and the current is turned off.

What I claim as my invention is:—

1. The method of side welding wires consisting in partially overlapping the wires longitudinally so that they will occupy a plane including the line of contact between them, that is inclined to the plane of the finished work and to the line of welding pressure, passing an electric current transversely across the overlapped joint and applying pressure to force the wires into the same plane.

2. The method of side welding wires consisting in partially overlapping the wires longitudinally so that they will occupy while in contact with one another a plane including the line of contact inclined to the plane of the finished work, passing an electric current transversely across the overlapped joint and applying pressure to force the wires into the plane of the finished work and at the same time preventing lateral spreading of the wires.

3. The method of side welding wires consisting in overlapping the sides of the wires at the place of weld so that they will occupy a plane including the line of contact at their sides inclined to the line of welding pressure and to the plane of the finished work, passing an electric current transversely across the overlapped wires and applying pressure to force the wires into the plane of the finished work and at the same time preventing relative sidewise movement of the wires away from each other.

4. The method of side welding wires consisting in partially overlapping the wires longitudinally in a position in which they will occupy a plane inclined to the line of welding pressure and holding them in such lapped position by welding dies, passing an electric current transversely across the joint, applying pressure by the welding dies to force the wires into the plane of the finished work and at the same time preventing lateral relative displacement of the dies.

5. The method of side welding wires consisting in gripping the wires in overlapped side contact between welding dies and while occupying a plane passing through the contact inclined to the line of pressure applied by said dies, passing an electric current from one die to the other transversely across the overlapped wires and applying pressure by said dies to force the wires into the desired plane and complete the weld while at the same time resisting the tendency of the wires to displacement sidewise or transversely to the line of applied pressure.

Signed at New York in the county of New York and State of New York this 9th day of July A. D. 1920.

LAURENCE S. LACHMAN.

Witness:
IRENE LEFKOWITZ.